Figure 1:
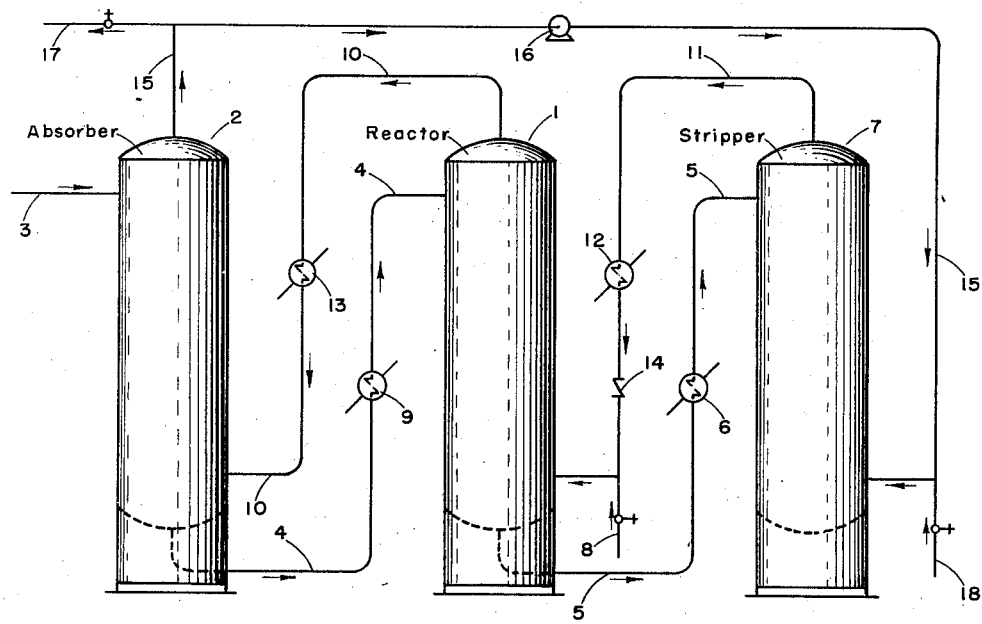

Jan. 8, 1946. W. O. WEBBER 2,392,791
CATALYTIC ISOMERIZATION PROCESS
Filed Nov. 25, 1943

William O. Webber INVENTOR.
BY P. J. Whelan
ATTORNEY.

Patented Jan. 8, 1946

2,392,791

UNITED STATES PATENT OFFICE 2,392,791

CATALYTIC ISOMERIZATION PROCESS

William O. Webber, Baytown, Tex., assignor to Standard Oil Development Company, a corporation of Delaware Application November 25, 1943, Serial No. 511,721

2 Claims. (Cl. 260—683.5)

The present invention is directed to a method and apparatus for carrying out reactions involving liquids and gases.

There are many reactions, in which a liquid is either reacted with a gas or reacted in the presence of a gas promoter, in which difficulty is encountered by reason of the carrying off of the gas by the liquid product. It is to the prevention of such loss of gaseous reagent or promoter or, in the alternative, the avoidance of expensive auxiliary equipment that the present invention is directed.

A typical process to which the present invention is applicable is the isomerization of normal paraffins to iso-paraffins in the presence of aluminum chloride and gaseous hydrogen chloride. The usual steps of this isomerization process consists of (1) mixing the normal paraffin with hydrogen chloride, (2) contacting this mixture, in which the HCl acts as a promoter, with AlCl₃ or other suitable catalyst at a suitable temperature and pressure, and (3) separating the hydrocarbon-HCl mixture leaving the reactor into gaseous HCl to be recycled back to the reactor and an iso-normal paraffin mixture which is subjected to fractionation.

According to the present invention processes of the aforesaid type are carried out with a minimum of apparatus and a minimum of expensive gas losses by adopting a flow plan which takes advantage of the change in solubility of the gas in the liquid with temperature. Briefly, in the process of the present invention a reaction zone is established into the bottom of which is fed the gas while the liquid is introduced at the top. The gas issuing from the top of the reactor is passed countercurrent to the liquid feed at a temperature suitable for absorption of the gas in the liquid. The liquid reaction product leaving the reactor is subjected to a temperature at which the solubility of the gas in the liquid is at a minimum and the gas so evolved is fed to the reaction zone. In the prefered embodiment of this invention use is made of an extraneous stripper gas so as to reduce the temperature to which the liquid reaction product must be heated in order to liberate the expensive reaction or promoting gas.

The method is applicable also to reactions between gases wherein, according to the present invention, a liquid is employed in which one of the reacting gases is less soluble than the other. The more soluble gas is fed to the reaction zone while the less soluble gas is introduced countercurrent to the liquid product from the reaction zone in a stripping relation thereto, while this liquid in turn at a reduced temperature is contacted with the effluent gas from the reaction zone to absorb therefrom the more soluble gas and return it to the reaction zone.

Figure 2:
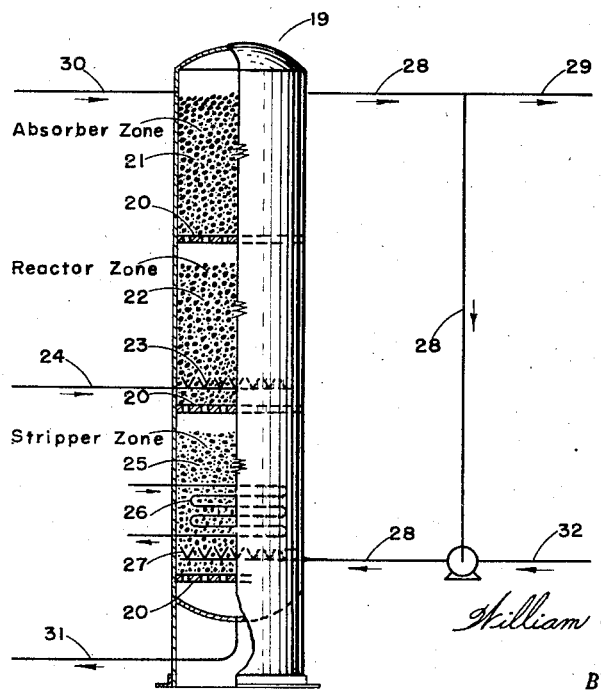

The nature of the present invention may be better understood from the following detailed description of the accompanying drawing, in which Fig. 1 is a front elevation in diagrammatic form of one type of apparatus suitable for the practice thereof, and Fig. 2 is a vertical section of an alternative embodiment.

Referring to Fig. 1 in detail, numeral 1 designates the reaction chamber, which, in a specific type of isomerization, will be packed with an adsorptive support carrying aluminum chloride. Ahead of reaction vessel 1 is a tower 2, which may be provided with bell cap plates or packed with contact material such as ceramic rings or balls. Assuming this apparatus to be used for the isomerization of butane in the liquid phase, the liquid butane is introduced into the top of tower 2 by way of line 3 and is conveyed from the bottom of tower 2 to the top of reaction vessel 1 by line 4. The reaction mixture leaves the bottom of vessel 1 through line 5, in which is arranged a heater 6, and is discharged into the top of a third tower 7 provided, similarly to tower 2, with internal contact equipment. Gaseous HCl is introduced into the bottom of reactor 1 through line 8.

In operating with this apparatus a sufficiently high pressure is maintained in each of the vessels to keep the hydrocarbons in the liquid phase. Tower 2 is maintained at a relatively low temperature suitable for maximum solubility of hydrogen chloride in butane. Vessel 1 is maintained at a temperature suitable for the isomerization of butane in the presence of aluminum chloride. To adjust this temperature, if need be, a heater 9 is provided in line 4. Tower 7 is maintained at the temperature of minimum solubility of HCl in butane.

The hydrogen chloride leaves reactor 1 through line 10, which feeds it into the bottom of tower 2. Hydrogen chloride liberated in tower 7 is conducted by line 11 to inlet line 8. Thus it will be seen that a maximum concentration of hydrogen chloride is maintained in the reaction vessel. In order to insure the maintenance of proper temperatures in tower 2 and vessel 1, coolers 12 and 13 are provided in lines 11 and 10, respectively. Line 11 is provided with a check valve 14.

In the preferred embodiment a stripper gas such as hydrogen, methane, $CO_2$, nitrogen, or the like, is employed. This gas is maintained in a closed cycle represented by line 15 connecting the top of tower 2 to the bottom of tower 7 and provided with a pump 16. The amount of stripper gas employed will be that determined to be sufficient to strip hydrogen chloride from the reaction product in tower 7 at the temperature maintained in this tower. Line 15 is provided with a bleed-off line 17 and a makeup line 18.

In the embodiment shown in Fig. 2 the sequence of operations is carried out in a single tower designated by numeral 19. This tower is divided into zones by partitions 20. The upermost zone is the absorption zone 21, packed in the manner referred to with respect to tower 2. The next lower zone is the reaction zone 22, packed the same as reaction vessel 1, Fig. 1, and provided at its bottom with a perforated ring or other distributing device 23, to which gaseous hydrogen chloride is fed by line 24. The lowermost zone 25 is provided with a heater 26, is suitably packed in the same manner as zone 21, and is provided near its bottom with a perforated ring or other distributing device 27, to which stripping gas is fed by line 28, which is also connected to the top of zone 21. Line 28 is provided with a draw-off line 29 from which gas may be bled off from time to time as required. The hydrocarbon feed is introduced into the top of zone 21 by line 30 and the hydrocarbon product is withdrawn from the bottom of zone 25 by line 31. It will be understood that temperature controlling coils may also be utilized in zones 21 and 22 if required. Makeup gas may be introduced into the system by way of line 32.

When this apparatus is employed for the reaction between a liquid and a gas, such, for example, as chlorination, the liquid to be chlorinated is introduced by way of line 30 and the chlorine is introduced by way of line 24. When a stripper gas is employed it will be introduced through line 28. It will be understood that, as in the case of the apparatus shown in Fig. 1, the provisions for the use of a stripper gas may be omitted.

When the apparatus is employed for the reaction between two gases of different solubility in a selected liquid, the more soluble gas is introduced through line 24 and the less soluble gas through line 28, while the liquid medium is introduced through line 30. In this case the liquid medium is recycled back to line 30, provision being made for the separation of the reaction product therefrom where the reaction product is a liquid.

The nature and objects of the present invention having been fully described and illustrated, what I desire to claim as new and useful and to secure by Letters Patent is:

1. In the isomerization of a normal paraffin hydrocarbon to an iso-paraffin in the presence of a catalyst and a gaseous promoter, the steps which comprise establishing three successive zones representing respectively an absorption zone, a catalytic zone in which the catalyst is arranged, and a desorption zone, maintaining the entire system at a pressure sufficient to keep the hydrocarbon in the liquid phase, maintaining the absorption zone at a temperature of maximum solubility of the promoter gas in the hydrocarbon, maintaining the desorption zone at a temperature of minimum solubility of the promoter gas in the hydrocarbon, introducing the hydrocarbon feed into the upper portion of the absorption zone and passing it in sequence through the three zones from the top to the bottom of each, introducing the gaseous promoter into the bottom of the reaction zone and maintaining gas flow from the top of the desorption zone to the bottom of the reaction zone and from the top of the reaction zone to the bottom of the absorption zone.

2. A process according to claim 1 in which a circulation of stripper gas different from the promoter gas is maintained through the system upwardly through each of the zones in sequence starting with the desorption zone.

WILLIAM O. WEBBER.